United States Patent [19]

Loomans

[11] 3,779,522

[45] Dec. 18, 1973

[54] COUPLING STRUCTURE FOR TWIN MIXER SHAFTS

[75] Inventor: Bernard A. Loomans, Saginaw, Mich.

[73] Assignee: Baker Perkins Inc., Saginaw, Mich.

[22] Filed: Dec. 9, 1971

[21] Appl. No.: 206,392

[52] U.S. Cl. ................... 259/192, 259/6, 287/111
[51] Int. Cl. ............................................... B01f 7/02
[58] Field of Search .................. 259/6, 21, 41, 104, 259/192, DIG. 8, 179; 287/111

[56] References Cited
UNITED STATES PATENTS

| | | | |
|---|---|---|---|
| 2,563,099 | 8/1951 | Cannon | 259/104 |
| 3,195,868 | 7/1965 | Loomans et al. | 259/104 |
| 3,198,491 | 8/1965 | Loomans et al. | 259/6 |
| 3,423,074 | 1/1969 | Loomans | 259/6 |
| 3,463,459 | 8/1969 | Loomans et al. | 259/6 X |
| 3,554,589 | 1/1971 | Boggs | 287/111 |
| 3,630,689 | 12/1971 | Wheeler et al. | 259/104 X |

Primary Examiner—Harvey C. Hornsby
Assistant Examiner—Philip R. Coe
Attorney—Learman et al.

[57] ABSTRACT

A mixer or reactor having axially parallel shafts with co-wiping, radially extending mixing and kneading members thereon, extending through a mixer or reactor barrel. A pair of intermeshing axially extending coupling members are provided to removably couple the mixer shafts with axially parallel drive shafts which are axially aligned with the mixer shafts and/or to removably couple elongate sections of the mixer shafts.

20 Claims, 5 Drawing Figures

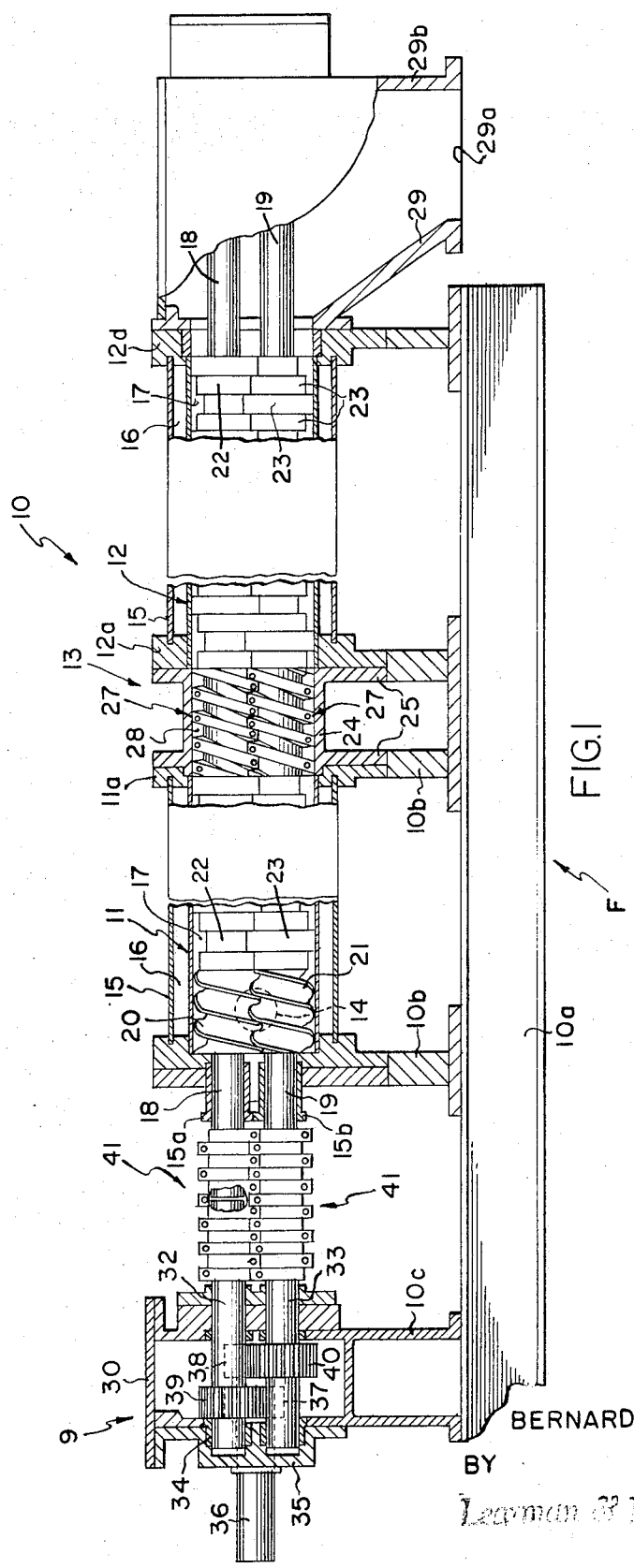

INVENTOR
BERNARD A. LOOMANS
BY
*Learman & McCulloch*
ATTORNEYS ns in mating pairs in the manner indicated in the patents

COUPLING STRUCTURE FOR TWIN MIXER SHAFTS

BACKGROUND OF THE INVENTION

This invention relates to mixers, and particularly those well suited to what may be termed the power kneading of plastic and like materials, which subject the material being processed to an intense shearing and kneading action. Still more particularly, this invention relates to apparatus having coupled axially aligned mixer shafts and driving shafts. In such mixers, the plastic, or other material, may be fed to the mixer in the form of a particulate mass, for instance, and may be heated therein to a temperature at which it forms a plastic mass which is moved from one end of the mixer to the other, and subjected to a kneading, mixing and blending action during its travel to an exit out which it is extruded.

In such mixers, the mixer shafts are driven by a pair of drive shafts axially aligned therewith. The mixer shafts in heavy duty mixers must be of such diameter, and so closely spaced, that conventional prior art coupling members of a proper diameter to couple the ends of coterminous mixer shafts to the drive shafts, for instance, will mutually interfere. Although it would be possible to stagger the terminal ends of the mixer shafts, and thus longitudinally stagger the coupling members to prevent interference thereof, the machine must than be lengthened a corresponding amount, nd the increased shaft length results in undesirable, increased shaft deflection. Accordingly, one of the prime objects of the present invention is to provide improved shaft coupling mechanism, for use in coupling closely spaced, conterminous mixer shafts with closely spaced drive shafts and/or mixer shaft extensions.

It is another object of the present invention to provide a shaft coupling mechanism which will transmit large torsional and bending forces to a pair of closely spaced mixer shafts.

It is a further object of the present invention to provide interwiping force transmitting coupling members for coupling a pair of closely spaced mixer shafts to a pair of mixer shaft extensions axially aligned therewith.

Other objects and advantages of the present invention will become apparent as the description thereof proceeds.

SUMMARY OF THE INVENTION

A multiple shaft mixer including a pair of side-by-side axially parallel mixer shafts having co-wiping mixer paddle sections thereon for forwarding material in a forward path of travel, and drive shafts in axial alignment with saie shafts for rotating said shafts about their own axes; a pair of coupling means for releasably coupling said mixer shafts and said drive shafts, each of said coupling means including sections in intermeshing engagement with complementally formed sections on the other of said coupling means. The drive shafts may comprise the mixer shafts of a first stage mixer barrel which are to be coupled to the mixer shafts in an additional barrel.

The present invention may more readily be described by reference to the accompanying drawings in which:

FIG. 1 is a partly elevational, and partly sectional, side elevational view of a multiple shaft mixer incorporating coupling apparatus constructed according to the present invention, part of one of the coupling members being broken away to more particularly illustrate the relative positions of the axially aligned shafts;

DESCRIPTION OF THE PREFERRED EMBODIMENT

Figure 3:
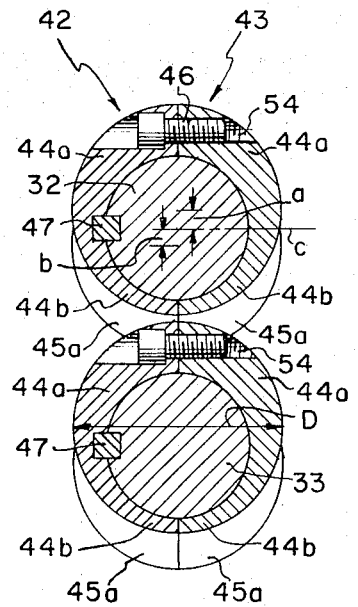
FIG. 3 is a sectional end view, taken along the line 3—3 of FIG. 2.

Referring now more particularly to the accompanying drawings, a mixer housing, generally designated 10, is conveniently supported on a frame, generally designated F, which includes a base 10a and pedestals 10b and comprises identical first and second stage, axially spaced barrel sections, generally designated 11 and 12, separated by a coupling section, generally designated 13.

The barrel sections 11 and 12 are well described in applicant's assignees' U.S. Pat. Nos. 3,198,491; 3,423,074; and 3,463,459, which are incorporated herein by reference, and accordingly, these sections will only be briefly described. The sections 11 and 12 each include a jacket 15 providing an annular space 16 through which a heating fluid, for example, may be continuously circulated to heat the material to a temperature proper for mixing of kneading it. The barrel sections 11 and 12 are each shaped to provide mixing and kneading chambers 17, which are figure 8 in shape, and in each of which a pair of axially parallel, closely spaced shafts 18 and 19 are mounted for rotation in the same direction by drive apparatus, generally designated 9, to be described more fully hereinafter.

Provided on the shafts 18 and 19, in each of the sections 11 and 12, are a series of mixing paddles 22 and 23 on the shafts 18 and 19, respectively. The paddles 22 and 23 are arranged on their respective shafts in mating pairs in the manner indicated in the patents mentioned. They may be of lenticular shape and displaced 90° one to the other. The parts of paddles may be termed "mating" or "matching" inasmuch as they continually wipe one another as well as the interior walls of the barrel sections 11 and 12. At the upstream end of the mixer section 11 are advancing or forwarding worm paddle sections 20 and 21 which receive the material from inlet port 14 and advance it to and through the paddles 22 and 23 of the section 11. Packing glands 15a and 15b are provided on shafts 18 and 19 and are secured to the section 11 in any well known manner to prevent leakage of material out the rear end of the barrel 11.

The drive apparatus 9, for driving the shafts 18 and 19, is generally similar to that described in applicant's assignees' U.S. Pat. No. 3,195,868, and includes a gear box or housing, generally designated 30, supported on the base 10a by pedestals 10c. A pair of axially parallel, closely spaced drive shafts 32 and 33 are journaled by bearings 34 provided in the side 35 of the gear box housing 30. A laterally spaced, power supplying shaft 36 is also journaled in the gear housing 30 and mounts a pair of axially spaced gears 37 and 38, meshing with gears 39 and 40 on the shafts 32 and 33, respectively.

A discharge housing, generally designated 29, may be secured to an end ring or flange 12d, on the downstream end of the mixer section 12, and provides a discharge spout 29a for the material discharged by the mixer section 12. The end wall 29b of the housing 29, mounts suitable bearings (not shown) which journal the ends of shafts 18 and 19 of barrel section 12.

The downstream and upstream ends of the axially spaced barrel sections 11 and 12 respectively include end rings or flanges 11a and 12a, so that the coupling section 13 may be readily secured thereto. The coupling section 13 includes a side wall 24 and radial end flanges 25 joined to the flanges 11a and 12a. The section 13 is internally configured to provide a chamber 28 of FIG. 8 shape substantially corresponding to the FIG. 8 shapes of the barrel sections 11 and 12. Disposed within the coupling section 13 are a pair of split coupling members, generally designated 27, to be described more fully hereinafter, for coupling the shafts 18 and 19 of barrel section 11 and the shafts 18 and 19, respectively of barrel section 12.

Apparatus constructed according to the present invention also comprises a pair of identical "split" coupling members, generally designated 41, for coupling the upstream ends of shafts 18 and 19, of the barrel section 11, to the drive shafts 32 and 33.

Figure 2:
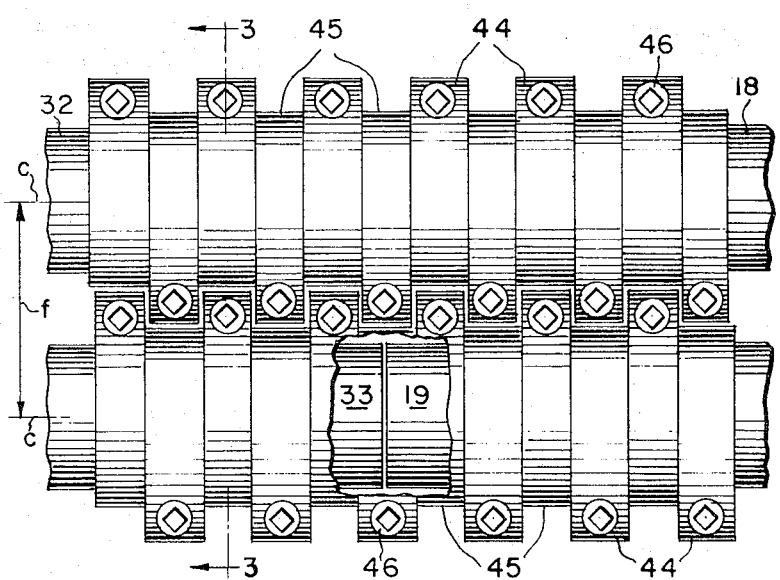
FIG. 2 is an enlarged, side elevational view of the left-hand pair of coupling members illustrated in FIG. 1.

Referring now more particularly to FIGS. 2 and 3, each of the coupling members 41 is split longitudinally into two separable, or partible, shaft-gripping sections 42 and 43 secured together by bolts 46. The shaft-gripping sections are identical and cooperate to define pluralities of axially intermeshed, cylindrical portions 44 and 45, each of which is eccentric with respect to the rotational axis $c$ of the shaft on which it is mounted. Each of the cylindrical portions 44 are in phase with each other, but 180° out of phase with each of the cylindrical portions 45. The diameters D of the portions 44 and 45 are equal and only slightly less than the distance $f$ between the axes $c$ of shafts 18 and 19.

As FIG. 3 indicates, the cylindrical eccentrically disposed portions 44 each have an eccentricity $a$ with respect to the axis $c$ of their respective drive shafts. Similarly, each of the eccentric portions 45 has an eccentricity $b$, with respect to the axis $c$ of their respective drive shaft, wich is equal to the eccentricity $a$ but 180° out of phase with it. As illustrated in FIG. 3, the portions 44 and 45, respectively, each include radially increased thickness sections 44a and 45a and opposed radially reduced thickness sections 44b and 45b. A plurality of bolts 46 are received on threaded openings in the radially increased thickness portions 44a and 45a of each of the portions 44 and 45, respectively, to clamp the partible shaft halves 42 and 43 to each other and to the axially aligned shafts 18, 32 and 19, 33. The placement of a bolt 46 in each of the sections 44 and 45 provides a more rigid structure than is possible if the bolts 46 are axially spread at greater intervals. Keys 47 (FIG. 3) are provided to positively prevent relative rotation of the shafts 18, 19, 32 and 33 and the coupling members 41. The coupling members 41 are intermeshed so that the eccentric cylindrical sections 44 and 45 of one coupling member are radially aligned, and in phase with, the eccentric cylindrical sections 45 and 44, respectively, of the other coupling member. This construction permits the coupling members 41 to be disposed in side-by-side relation with one another and to be of sufficient size to transmit large torsional and bending forces.

Figure 5:
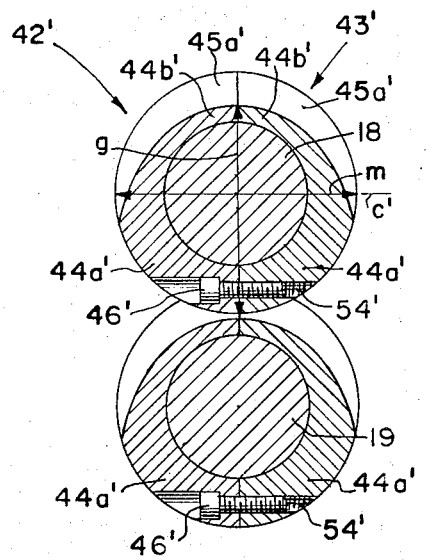
FIG. 5 is a sectional end view, taken along the line 5—5 of FIG. 4.
Figure 4:
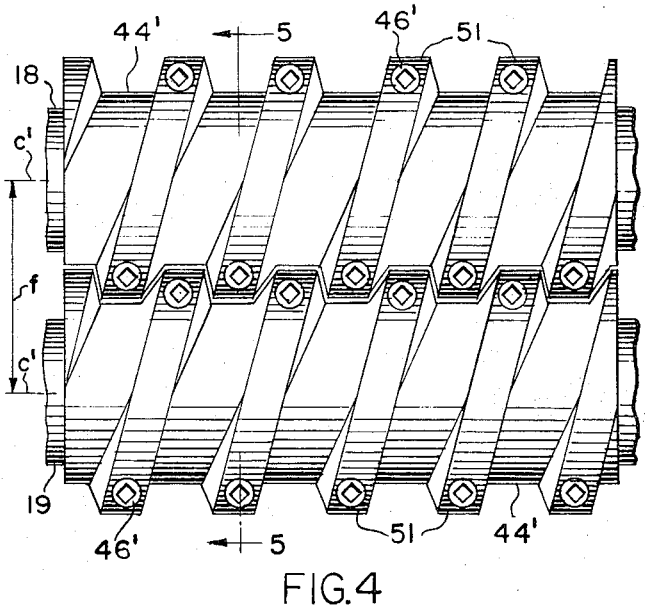
FIG. 4 is an enlarged, side elevational view of the right-hand pair of coupling members illustrated in FIG. 1.

Referring now more particularly to FIGS. 4 and 5, the coupling members 27 disposed in the coupling barrel section 13 are illustrated. The coupling members 27 removably couple the shafts 18 and 19 of sections 11 to the shafts 18 and 19 of section 12. Each coupling member 27 comprises a pair of identical longitudinal halves 42' and 43' which cooperate to define a screw having a continuous helical land 51 intermeshed with the like land 51 of the other coupling screw 27. The halves 42' and 43' are held together in clamping engagement with the shafts 18 and 19 by a plurality of bolts 46' received in suitable threaded apertures 54' provided in the increased thickness portions 44a' on opposite sides of each of the land portions 51. The portions 44' between the continuous land 51 are of a diameter $g$ substantially smaller than the diameter $m$ of the continuous land 51. Since the radial thickness of the annular wall sections 44b' of the portions 44' is substantially smaller than the radial thickess of the annular wall sections 44a', the bolts 46 pass only through the wall 44a' of each land or flight 51, however, they are longitudinally staggered with respect to other bolts on the same coupling member. The continuous land 51 of each coupling member 27 is intermeshed with the land, or flight 51, of the other coupling member and in wiping engagement therewith so as to effect a mutual wiping of the flanks and peripheries of the land 51, as well as a wiping of the interior surface of barrel section 13.

Because the lands 51 of the coupling members 27 are intermeshed with each other, the distance $f'$ between the axes $c'$ of the shafts can be considerably less than it otherwise would be without such intermeshing. The diameter $m$ of the land 51 is substantially axial to the distance $f'$ between the axes $c'$ of the shafts 18 and 19. As the coupling members 27 are rotated, the lands 51 mutually wipe each other to effect a self-cleaning similar to that accomplished with the paddles 22 and 23.

It should be understood, of course, that the lands 51 could be mounted eccentrically relative to the axes $c'$ with the eccentricity of the coupling members 27 being equal and in phase with one another.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A multiple shaft mixer including:
    a pair of closely spaced, side-by-side longitudinal mixer shafts having mixer elements thereon for forwarding material to be mixed in a forward path of travel;
    means journaling said mixer shafts for rotation about their axes;
    mixer housing means for said mixer shafts;
    a pair of closely spaced side-by-side longitudinal drive shafts axially aligned with said mixer shafts for rotating said mixer shafts about their own axes; and
    apparatus for coupling said mixer shafts with said drive shafts comprising:

a pair of shaft gripping coupling members for coupling said drive shafts with the mixer shafts axially aligned therewith;

each of said members including axially spaced sections intermeshed with the axially spaced sections of the other of said members.

2. The apparatus of claim 1 wherein each coupling member has axially adjacent sections which are of differing radial extents and the sections of one member are in co-wiping relation with the sections of the other member.

3. The apparatus set forth in claim 1 wherein each of said coupling members comprises a pair of confronting, separable, symmetrical half portions for releasably gripping opposite sides of each of said drive and mixer shafts; and means for removably clamping the half portions of each coupling member to opposite sides of each of said drive and mixer shafts; the half portions of each coupling member cooperating to define said axially spaced sections.

4. The apparatus of claim 3 wherein the axially spaced sections of each coupling member are equally eccentric, each coupling member having axially adjacent sections which are 180° out-of-phase with each other.

5. The apparatus of claim 3 wherein said axially spaced sections of each coupling member are eccentric cylindrical members in wiping engagement with the eccentric cylindrical members of the other of said coupling members.

6. The apparatus of claim 3 wherein said axially spaced sections of each coupling member define a screw having flights intermeshed with the flights of the other coupling member.

7. The apparatus set forth in claim 1 wherein each of said coupling members includes a pair of longitudinal, symmetric shaft gripping members, for gripping said aligned drive and mixer shafts to be coupled, and means for removably connecting said gripping members and shafts together, each of said shaft gripping members including a plurality of axially spaced eccentrically disposed portions constituting said axially spaced sections.

8. The apparatus set forth in claim 7 wherein said plurality of eccentric portions on each shaft comprise first and second groups of 180° out-of-phase, equally eccentric members.

9. The apparatus defined in claim 1 wherei each of said coupling members includes a pair of removably coupled, confronting half portions for gripping and coupling said axially aligned mixer and drive shafts, said half portions of each of said coupling members cooperating to define said axially spaced sections, said axially spaced sections being cylindrical sections of substantially the same diameter, the axially spaced sections of one member being intermeshed with the cylindrical sections of the other coupling member, the distance between the axes of said mixer shafts being substantially equal to the diameter of said cylindrical sections.

10. The apparatus of claim 9 wherein the diameters of the axially spaced cylindrical sections of each coupling member are substantially equal.

11. A multiple shaft mixer including:

a pair of closely spaced, parallel mixer shafts having mixer members thereon;

means journaling said mixer shafts for rotation about their axes;

housing means for said mixer shafts;

a pair of closely spaced parallel shafts in axial alignment with said pair of mixer shafts; and a pair of coupling means for coupling said mixer shafts with said last mentioned shafts;

each of said coupling means including a plurality of axially spaced eccentrically disposed means intermeshed with the axially spaced eccentrically disposed means of the other of said coupling means.

12. The apparatus set forth in claim 11 wherein the eccentrically disposed means on said coupling means are in wiping engagement; and each of said coupling means includes first and second, opposed, partible portions, and means for removably clamping said particle portions to said axially aligned shafts.

13. The apparatus as set forth in claim 11 wherein said eccentrically disposed means on each shaft comprises a plurality of axially spaced members, all of which are equally eccentric relative to the axes of the shafts which they couple, each eccentric means having adjacent members 180° out-of-phase with each other and rigidly connected together for simultaneous movement.

14. The apparatus set forth in claim 11 wherein said eccentrically disposed means on each coupling means comprises first and second axially spaced, 180° out-of-phase eccentric portions in radial alignment with the first and second axially spaced 180° out-of-phase eccentric portions, respectively, of the other shaft.

15. The apparatus of claim 14 wherein each of said first and second eccentric portions are cylindrical and have substantially equal diameters, the distance between the axes of said shafts being substantially equal to the diameters of said cylindrical portions.

16. A shaft coupling member for coupling the aligned adjacent ends of an axially aligned pair of shafts, such as mixer shafts and the like, said coupling member comprising:

a pair of longitudinally extending, radially confronting, shaft gripping members for gripping the said aligned, adjacent ends of a pair of axially aligned shafts to be coupled; and means for connecting said gripping members and said shafts together, each of said shaft gripping members including a plurality of axially spaced 180° out-of-phase, equally eccentric portions.

17. The coupling member of claim 16 wherein said connecting means comprises a plurality of clamping members engageable with said eccentric portions for clamping said pair of shaft gripping members to said shafts.

18. Apparatus including a mechanism for coupling the aligned adjacent ends of an axially aligned pair of shafts, such as mixer shafts with a second pair of shafts comprising:

a pair of axially parallel, longitudinally extending shafts;

a second pair of axially parallel, longitudinally extending shafts in axial alignment therewith;

said pairs of shafts having adjacent shaft ends in near abutting relation;

a pair of longitudinally extending, radially confronting, shaft uniting, coupling members spanning the axially adjacent ends of said shafts; and means for connecting said coupling members with said shafts to transmit rotational movement from one pair of shafts to the other;

said coupling members each comprising axially split portions having a plurality of sections which are eccentric to the axes of the shafts on which they are mounted and intermeshed with like sections on the other coupling member.

19. The combination defined in claim 18 in which said sections form intermeshed helices.

20. The combination defined in claim 18 in which said intermeshed coupling members have radially co-wiping sections which are generally oppositely eccentric.

* * * * *